G. W. THORSELL.
SHEARS.
APPLICATION FILED APR. 11, 1908.
913,072.
Patented Feb. 23, 1909.
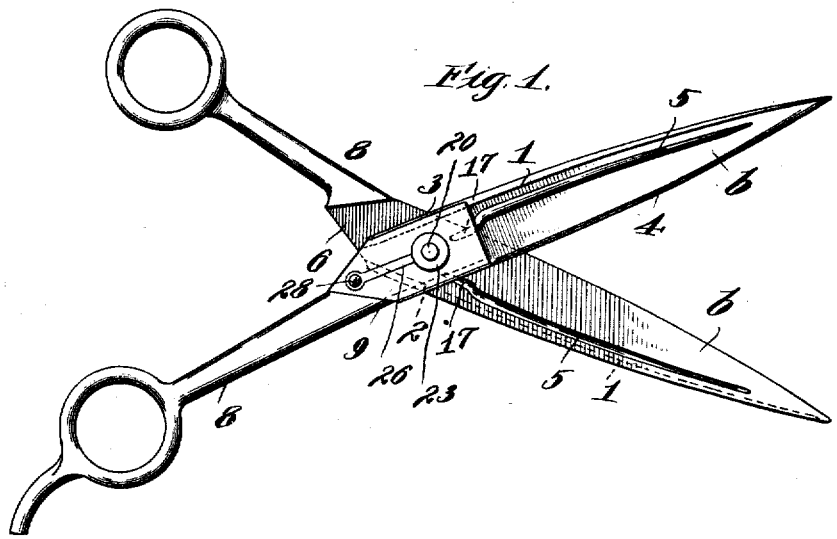
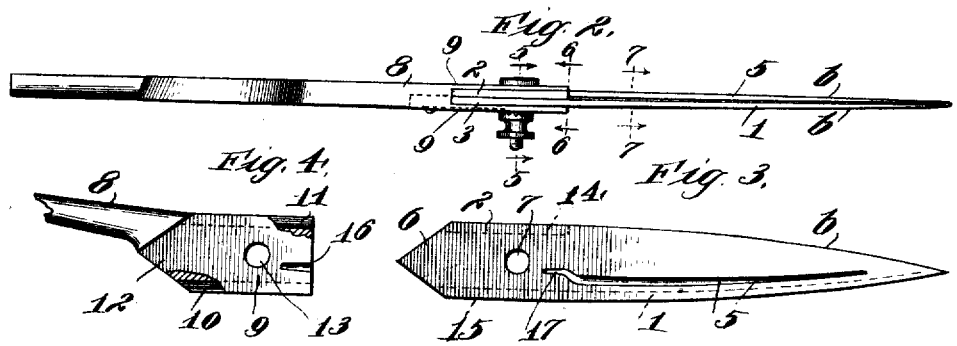
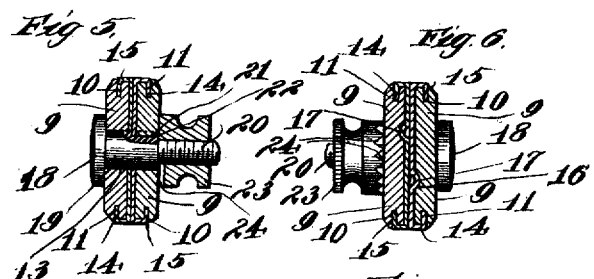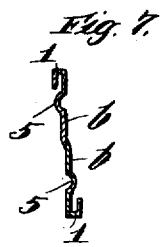
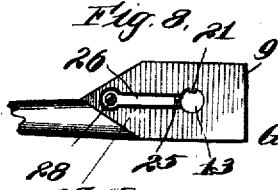
Witnesses:
G. A. Paubenschmidt
Hengl E. Higham
Inventor
Gustav W. Thorsell
By Browne & Williams
Attys

UNITED STATES PATENT OFFICE.

GUSTAV W. THORSELL, OF CHICAGO, ILLINOIS.

SHEARS.

No. 913,072.      Specification of Letters Patent.      Patented Feb. 23, 1909.

Application filed April 11, 1908. Serial No. 426,430.

*To all whom it may concern:*

Be it known that I, GUSTAV W. THORSELL, a citizen of the United States, residing at Chicago, in the county of Cook and State of Illinois, have invented a certain new and useful Improvement in Shears, of which the following is a full, clear, concise, and exact description, reference being had to the accompanying drawings, forming a part of this specification.

My invention relates to shears, or scissors, particularly to that class having detachable blades, the object of my invention being to provide a stronger and more efficient arrangement.

In the accompanying drawings, which illustrate my invention, Figure 1 is a plan view of a pair of shears partly open; Fig. 2 is an edge view; Fig. 3 is an inside view of one of the blades; Fig. 4 is an inner view of a handle base; Fig. 5 is a sectional view taken on plane 5, 5 Fig. 2; Fig. 6 is a sectional view taken on plane 6, 6; Fig. 7 is a sectional view taken on plane 7, 7, Fig. 2, and Fig. 8 is a top view of a handle base.

The blades $b$ are formed of thin sheet steel, which when soft can be readily worked and which can be tempered to any desired degree of hardness. The general outline of a blade is the same as that of the blade of an ordinary shears. The rear edge of the blank during formation is turned upwardly and inwardly to form thus a stiff, rigid back 1. A section 2 of the edge along the base of the blade is also turned upwardly and inwardly to be parallel with the part of the back along the base. The remaining part of the front edge forms the cutting edge. Between the back and the cutting edge, there is formed a stiffening ridge or rib 5, which may be placed in the most suitable position to give the required strength and stiffness. The base edge 6 of the blade is V-shaped and pointed, and through the base there is a pivot hole 7. There may be any number of these stiffening ribs, depending more or less upon the size of the blade, and the thickness of the metal used will also vary with the size. This blade, as described, can be stamped integral from the soft sheet steel with very few operations and when tempered is very rigid and strong.

In the particular shears shown, both blades may be alike and the handle parts may also be alike. Each handle part, as shown, comprises a grip arm 8 and a base part 9. The base part is flat and in its outer edges are the parallel channels or grooves 10 and 11. The inner end 12 of the base part is V-shaped, as shown, to correspond with the V-shaped end of the blade. Through the base part, there is also the pivot opening 13 for receiving a pivot mechanism which will be described later. When the blade is applied to the base part, the inturned ends 14 and 15 of the flange parts 2 and 3 enter the slots 10 and 11 and the V-shaped end 6 is brought into register with the V-shaped end 12 and against the base of the grip part 8. Pivot openings 7 and 13 also go into register. To further assist in holding the parts rigidly together, a short groove 16 may be formed at the inner edge of the base part for receiving the base end 17 of the rib 5. In this manner, the blade is firmly and rigidly held to the base part.

The pivot mechanism is most plainly shown in Figs. 5 and 6. A pivot screw has the head or flange 18, the cylindrical shank part 19 and the threaded end 20 of reduced diameter. The pivot opening 13 of the shear member at the head end of the pivot screw is circular, and this shear member will rotate about the screw shank. The pivot hole in the other shear member has a tongue or key 21 for engaging in a slot or key way 22 formed in the screw shank so that the screw will turn with this shear member. The threaded end 20 is engaged by the knurled nut 23. This nut has locking teeth 24 cut in its engaging edge for engaging with the locking end or point 25 of a locking spring 26. This spring is disposed in a groove 27, in which it is fastened by the screw 28. The locking point 25 of the spring extends in the path of the locking teeth and when the nut has been turned, to obtain the desired adjustment between the shear members, this locking point engages between the teeth and locks the nut in position so that the adjustment will be retained. The pivot screw, the nut and the shear member engaged by the nut are thus relatively immovable, the other shear member rotating about the shank of the screw. The shear member engaged by the nut is preferably the top shear member, particularly in barbers' shears, to prevent the catching of hair in the nut. Very fine adjustment can be obtained with this pivot arrangement, and the nut being always locked against loosening, the adjustment will be maintained.

The blades, of course, can be made of any size and of any thickness of metal, depending upon the size of the shears. In tailors' shears, for example, the blades would have to be much larger and of heavier stock. More strength in the ribs would also be necessary and the blade members of the shears would also be different. The general construction, however, particularly the connection of the blades with the handle bases, will be the same as that described with reference to the shears shown on the drawing.

I desire to secure the following claims for United States Letters Patent:

1. In a pair of shears having detachable blades, the combination of a handle part having parallel grooves or channels in its side edges, and a blade having tongues or flanges for engaging said grooves or channels.

2. In a pair of shears, the combination of a handle part and a detachable blade part, said blade part being formed of sheet material and having two parallel flanges, the handle part having grooves or channels in its side edges for receiving the flanges of the blade.

3. In a pair of shears, the combination of handle parts and detachable blades, each blade being stamped integral from sheet steel, inturned parallel flanges at the base of each blade, the edges of the base part of each handle part being provided with slots for receiving the flanges of the associated blade, and a pivot member passing through the handle base parts and the bases of the blades.

4. In a pair of shears, the combination of a handle part and detachable blade, said blade being stamped integral from sheet material, the rear edge of the blade being turned upwardly and inwardly to form a rigid back, the other edge at the base of the blade being also turned upwardly and inwardly parallel with the part of the back at the base, the remaining front edge forming the cutting edge, the handle comprising a base part and a grip arm, said base part having parallel side edges, each provided with a groove or slot, the inwardly turned edges at the base of the blade part engaging in said slots or grooves to rigidly secure the blade to the handle part.

5. In a pair of shears, the combination of a handle part and detachable blade, said blade being stamped integral from sheet material, the rear edge of the blade being turned upwardly and inwardly to form a rigid back, the other edge at the base of the blade being also turned upwardly and inwardly parallel with the part of the back at the base, the remaining front edge forming the cutting edge, the handle comprising a base part and a grip arm, said base part having parallel side edges, each provided with a groove or slot, the inwardly turned edges at the base of the blade part engaging in said slots or grooves to rigidly secure the blade to the handle part, and a strengthening rib or ribs formed in the blade between the back and cutting edge.

6. In a pair of shears, the combination of the shear members, each comprising a handle part and a detachable blade part, a pivot screw passing through all the parts, one of the shear members being keyed to the pivot screw, the other member being free to rotate thereon, a nut engaging the end of the pivot screw, teeth cut into the lower edge of said nut, and a locking spring secured at one end to the adjacent shear member and having a locking point at its other end for engaging between the teeth to thereby lock the nut to maintain adjustment between the shear members.

7. In a pair of shears, the combination of handle members and detachable blades therefor, each handle part comprising a base part and a gripping arm, the base parts having parallel side edges, each provided with a channel or groove, the blades being stamped integral from sheet material, the rear edge of each blade being turned upwardly and inwardly to form an inturned flange, the front edge at the base part of the blade being also turned upwardly and inwardly to form a flange opposite and parallel to the flange at the back of the blade, the remainder of the front edge of the blade forming the cutting edge, said opposite flanges engaging in the grooves or channels of the corresponding handle base part, the rear ends of the handle bases and of the blade bases being V-shaped and coming into register when the blades are applied, a pivot screw passing through the base parts of the handles and blades, an adjusting nut for engaging the screw locking means for holding said nut in adjusted position, and strengthening ribs or ridges formed in the blades.

8. In a pair of shears, the combination of a handle part, a detachable blade formed integral of sheet material, the rear edge of said blade being turned upwardly and inwardly to form a rigid back, the front edge of the blade forming the cutting edge, a strengthening rib formed in the blade between the back and the cutting edge, and a groove at the edge of the handle part for receiving the end of the rib.

9. In a pair of shears, the combination of a handle part, a detachable blade for the handle part formed integral from sheet metal, the rear edge of the blade being turned upwardly and inwardly to form a rigid back, the front edge of the blade forming a cutting edge, a groove or channel in a side edge of the handle part for receiving the in-turned edge of the back of the blade, and a pivot screw passing through the body part and blade to assist in holding the blade to the body part.

10. In a pair of shears, the combination of a handle part, a detachable blade for the handle part formed integral from sheet metal, the rear edge of the blade being turned upwardly and inwardly to form a rigid back, the front edge of the blade forming a cutting edge, a groove or channel in a side edge of the handle part for receiving the in-turned edge of the back of the blade, a longitudinal strengthening rib stamped in the blade upon formation thereof, and a groove at the front edge of the body part for receiving the end of the strengthening rib.

In witness whereof, I hereunto subscribe my name this 8th day of April, A. D. 1908.

GUSTAV W. THORSELL.

Witnesses:
 CHARLES J. SCHMIDT,
 GEORGE E. HIGHAM.